United States Patent [19]

Tanii et al.

[11] Patent Number: 4,712,871
[45] Date of Patent: Dec. 15, 1987

[54] POSITIONING MECHANISM FOR POSITIONING AUXILIARY OPTICAL DEVICE RELATIVE TO MAIN OPTICAL DEVICE AND THE AUXILIARY OPTICAL DEVICE

[75] Inventors: Junichi Tanii; Yukio Maekawa, both of Sakai, Japan

[73] Assignee: Minolta Camera Kabushiki Kaisha, Osaka, Japan

[21] Appl. No.: 755,898

[22] Filed: Jul. 17, 1985

[30] Foreign Application Priority Data

Jul. 23, 1984 [JP] Japan ............... 59-153500

[51] Int. Cl.$^4$ .................. G02B 7/02; B23Q 16/00
[52] U.S. Cl. ................... 350/257; 74/813 L
[58] Field of Search ............. 350/257; 354/286, 400; 403/320, 325, 348–349; 285/91; 74/527, 813 R, 813 L, 815–816, 821, 529; 248/408–409

[56] References Cited

U.S. PATENT DOCUMENTS

| 2,083,637 | 6/1937 | Colaiace | 350/257 |
| 3,078,964 | 2/1963 | Wildhaber | 74/527 |
| 4,269,497 | 5/1961 | Ishizaka et al. | 354/286 |
| 4,449,807 | 5/1984 | Miki et al. | 350/255 |
| 4,492,429 | 1/1985 | Miki et al. | 350/257 |
| 4,564,265 | 1/1986 | Miki | 350/257 |

FOREIGN PATENT DOCUMENTS 53-49390 11/1978 Japan .
53-50420 12/1978 Japan .
54-38911 11/1979 Japan .
52157 5/1981 Japan .................. 74/816

OTHER PUBLICATIONS

Carlson, J. A. "Constant-Load Cam Design" Machine Design 7-10-58, pp. 121-128.
Kloomok et al, "Plate Cam Design" Product Engineering, 2-1955, pp. 156-162.
Sanderson, A. E. "Minimum Cam Size", Product Engineering, 7-1956, pp. 141-143.

Primary Examiner—William H. Punter
Attorney, Agent, or Firm—Burns, Doane, Swecker & Mathis

[57] ABSTRACT

A positioning mechanism for positioning an auxiliary optical device relative to a main optical device, and the auxiliary optical device. Thje positioning mechanism includes a positioning member and a positioning recess which are provided on one and the other of the main and auxiliary optical devices, respectively so as to be engaged with each other with a clearance. Each of the positioning member and the positioning recess includes a leding side face portion and a trailing side face portion being opposite to and in alignment with the leading side face portion in a direction of relative movement of the main and auxiliary optical devices. The trailing side face portions of the positioning member and the positioning recess have a configuration which allows the trailing side face portions not to contact with each other when the relative movement is effected at a speed faster than a predetermined speed.

18 Claims, 20 Drawing Figures

POSITIONING MECHANISM FOR POSITIONING AUXILIARY OPTICAL DEVICE RELATIVE TO MAIN OPTICAL DEVICE AND THE AUXILIARY OPTICAL DEVICE

BACKGROUND OF THE INVENTION

The present invention generally relates to an optical apparatus which is constituted by a main optical body and an auxiliary optical device mountable on and dismountable from each other, and more particularly, to a positioning mechanism of the optical apparatus for positioning the auxiliary optical device relative to the main optical device in the mounting completed condition and further to the auxiliary optical device which has a positioning recess constituting a part of the positioning or locking mechanism.

A typical example of this kind of optical apparatuses is a lens interchangeable camera constituted by a camera body as the main optical device and an interchangeable lens as the auxiliary optical device. Conventional mounting and dismounting mechanisms provided on this kind of optical apparatuses have already minimized a mounting torque and a rotational angle necessary for the mounting of the auxiliary device on the main device, so that rapid mounting and dismounting operations are made possible when desired. For example, in the case of a lens interchangeable camera as described above, a photographer can replace an interchangeable lens mounted on a camera body with another one instantaneously in accordance with his or her choice. However, rapid mounting and dismounting operations, when repeated, give rise to ill affections on the positioning mechanism of the optical apparatus as described later in detail.

A lens interchangeable camera as an example of such optical apparatuses equipped with a positioning mechanism is proposed in Japanese Utility Model Publication No. 50420/1978 (Jikkosho 53-50420). The camera is provided with a bayonet mounting mechanism. When a positioning member is displaced to such a predetermined position as to confront a positioning recess upon an operation for mounting the interchangeable lens on the camera body, the positioning member urged by a spring projects into the positioning recess so as to be brought into engagement with the positioning recess. Meanwhile, the positioning member is disengaged from the positioning recess upon a disengagement operation of an unlocking member. However, in this known positioning mechanism, when the interchangeable lens is rapidly mounted on the camera body, the positioning member urged by the spring projects into the positioning recess at a speed lower than a rotational speed for mounting the interchangeable lens on the camera body and therefore, comes into collision with a rear side face of the positioning recess before projecting into the positioning recess to a predetermined depth, with the result that the engagement of the positioning member with the positioning recess is insufficient while the mounting operation for mounting the interchangeable lens on the camera body is completed. In the case where interchange of the interchangeable lens is performed frequently causing such insufficient engagement between the positioning member and the positioning recess, the rear side face of the positioning recess formed on the mount face of the interchangeable lens is gradually dented by large impact forces applied frequently thereto from the positioning member provided in the camera body and thus, the mount face of the interchangeable lens swells at the side face of the positioning recess. Meanwhile, the positioning member of the camera body is also gradually dented, at its portion brought into collision with the rear side face of the positioning recess, due to its insufficient engagement with the positioning recess. Consequently, a play between the positioning member and the positioning recess increases. Moreover, the positioning member, which is slidably fitted in a guide hole formed on a mount face of the camera body, is strained to come into accidential frictional contact with the peripheral face of the guide hole and thus fails to project into the positioning recess sufficiently. In an extreme case, such a phenomenon takes place that the mounting operation is completed without engagement between the positioning member and the positioning recess through skip of the positioning member over the positioning recess.

Recently transmission of electric signals and mechanical driving forces between a camera body and an interchangeable lens has become more and more necessary in lens interchangeable cameras to increase their performance such as automatic exposure control and automatic focus control. Here assume that a camera includes transmission members for transmission of various electrical signals and mechanical driving forces between a camera body and an interchangeable lens and that a known positioning mechanism as described above is employed to such a camera. If the mounting of the interchangeable lens on the camera body is completed with improper positioning of the interchangeable lens relative to the camera body due to increasement of the play between the positioning member and the positioning recess or due to skip of the positioning member over the positioning recess, the transmission members will fail to perform the electric signal and driving force transmission as required, resulting in, for example, erroneous exposure control and focus control. Particularly in case a driving force for automatic focus control is transmitted from a camera body to an interchangeable lens through a driving shaft on the side of the camera body and a driven shaft on the side of the interchangeable lens and the driving shaft engages the driven shaft in association with the projection of the positioning member into the positioning recess, the improper positioning of the interchangeable lens relative to the camera body will result in an insufficient engagement between the driving and driven shafts, and therefore, engaging portions of the driving and driven shafts will be damaged when an automatic focusing operation to rotate the driving shaft is started by a photographer who is unaware of the improper positioning.

Another example of a lens interchangeable camera equipped with a positioning mechanism is proposed in Japanese Utility Model Publication No. 38911/1979 (Jikkosho 54-381911). The camera in this case is provided with a screw or thread mounting mechanism. A positioning member provided on a camera body is fitted into a positioning recess formed on the interchangeable lens during a final time rotation of the interchangeable lens for threadedly mounting the interchangeable lens in position. In this prior art camera, even if the interchangeable lens is erroneously threaded into the camera body after an unlocking member has been depressed, the interchangeable lens is fixed in position. Furthermore, since a gentle inclined face is so formed as to extend continuously from the positioning recess in the rotational direction for dismounting the interchangeable lens from the camera body, it becomes possible to threadedly disengage the interchangeable lens from the camera body by depressing the unlocking member. Namely, in this prior camera, since the gentle inclined face, whose angle of inclination will be preferably set to be not more than 45° in view of demounting of the interchangeable lens from the camera body, is so provided as to extend continuously from the positioning recess in the rotational direction for dismounting the interchangeable lens from the camera body as described above, the positioning member projects into the positioning recess after slidingly contacting the gentle inclined face. Accordingly, in the case where the interchangeable lens is rapidly mounted on the camera body, the amount of the projection of the positioning member into the positioning recess becomes insufficient due to the small angle of inclination of the inclined face with a consequence that the positioning member will not be able to fully engage the positioning recess. This may cause the positioning member and the rear side face of the positioning recess to be dented by impact forces produced therebetween. Furthermore, if this prior art camera were constructed to effect drive transmission for focus control between the camera body and the interchangeable lens through driving and driven shafts brought into engagement with each other in operative association with the projection of the positioning member into the positioning recess, the problem of the damage of engaging portions of the driving and driven shafts would occur in the same manner as described earlier. In addition, upon dismounting of the interchangeable lens from the camera body, the driving shaft would be still held in slight engagement with the driven shaft while the positioning member would be retracted away from the positioning recess to a height corresponding to the inclined face so as to disengage from the positioning recess, so that such a problem might arise that a rotational force for dismounting the interchangeable lens from the camera body is received by the driving shaft but not by the positioning member thereby increasing the possibility of the damage of the engageable portions of the driving and driven shafts.

In U.S. Pat. No. 4,449,807, a lens interchangeable camera is proposed in which in the case where an automatic focusing driving shaft provided in a camera body is insufficiently engaged with a driven shaft provided in an interchangeable lens, a switch member is opened or closed by the driving shaft or a positioning member associated operatively with the driving shaft so as to generate a warning signal or so as to make the optical apparatus inoperative for notifying the operator of the necessity to secure a proper engagement between the driving shaft and the driven shaft. Thus, it is possible to prevent the positioning member or the positioning recess from being dented or eliminate inaccurate information transmission between the camera body and the interchangeable lens. However, this known optical apparatus suffers from rise in production cost since the switch member is provided and is required to be adjusted in position. Moreover, since an additional space is required for the switch member, the known optical apparatus is made large in size.

SUMMARY OF THE INVENTION

It is an object of the present invention to provide a positioning mechanism which is capable of assuring complete engagement of a positioning member with a positioning recess even when an auxiliary optical device is mounted on a main optical device rapidly.

Another object of the present invention is to provide a positioning mechanism which is capable of properly positioning an auxiliary optical device relative to a main optical device even where the mounting of the auxiliary optical device on the main optical device is repeated rapidly.

Still another object of the present invention is to provide a positioning mechanism which is capable of eliminating erroneous transmission of electrical signals and/or mechanical driving forces between an auxiliary optical device and a main optical device by the proper positioning of the auxiliary optical device relative to the main optical device.

Yet another object of the present invention is to provide an auxiliary optical device which constitutes a part of an optical apparatus for which the positioning mechanism achieving the above objects is employed.

A positioning mechanism of the present invention features in a configuration of a positioning member and a positioning recess which allows the positioning member to engage in the positioning recess without causing a front side face of the positioning member to contact with a front side face of the positioning recess when two optical devices, one of which includes the positioning member and the other of which includes the positioning recess, are moved relative to each other at a speed faster than a predetermined speed for mounting of the one optical device on the other. The configuration makes it possible to have the positioning member project into the positioning recess by an amount sufficient for preventing denting or deformation of the positioning member and the positioning recess before a rear side face of the positioning member collides with a rear side face of the positioning recess. Thus even where the mounting of the one optical device on the other optical device is repeated rapidly the engagement of the positioning member with the positioning recess can continue to serve for properly positioning the two optical devices relative to each other. This eliminates erroneous transmission of electrical signals and/or mechanical driving forces between the two optical devices if members for the transmission are provided on the two optical devices.

In preferred embodiments of the present invention, a camera body and an interchangeable lens of a lens interchangeable camera includes the positioning member and the positioning recess, respectively. In a first preferred embodiment of the present invention, the front side face of the positioning recess is formed with a convex arc portion and first and second straight slope portions sequentially from the entrance part of the positioning recess while the front side face of the positioning member is formed to be a straight face extending straightly in its longitudinal direction parallel with the direction of its projection from the mount member of the camera body. In a second preferred embodiment, the front side face of the positioning member is formed with a convex arc portion and a first straight slope portion sequentially from the distal end of the positioning member while the front side face of the positioning recess is formed with a second straight slope portion at the entrance part of the positioning recess. In a third preferred embodiment, the second straight slope portion of the positioning recess in the second embodiment is modified so as to be formed at the whole periphery of the entrance part of the positioning recess to facilitate machining thereof. Meanwhile, the angles of the inclination of the first and second straight slope portions with respect to the direction of the relative movement of the two optical devices are not less than 60° in the first to third embodiments, respectively.

BRIEF DESCRIPTION OF THE DRAWINGS

These objects and features of the present invention will become apparent from the following description taken in conjunction with the preferred embodiments thereof with reference to the accompanying drawings, in which:

FIGS. 6b, 6c and 6d are graphs showing projecting states of the positioning member of FIG. 6a;

FIGS. 7a, 7b, 7c and 7d are views explanatory of engagement procedures of the positioning member of FIG. 6a;

Before the description of the present invention proceeds, it is to be noted that like parts are designated by like reference numerals throughout several views of the accompanying drawings.

DETAILED DESCRIPTION OF THE INVENTION

Figure 1:
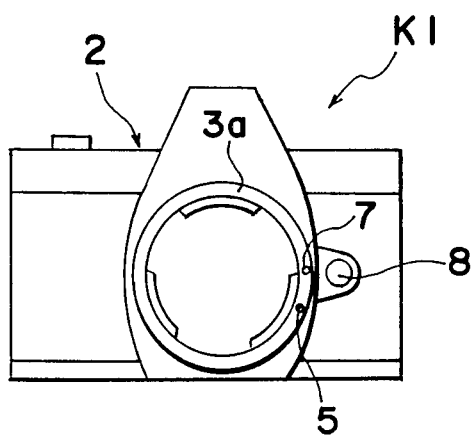
FIG. 1 is a front elevational view of a camera body of a photographic camera according to a first embodiment of the present invention.
Figure 2:
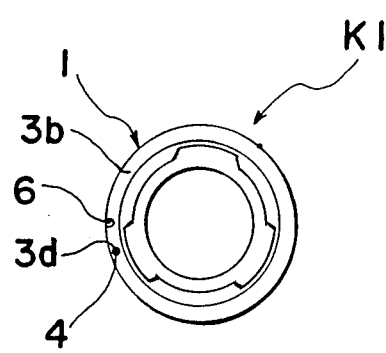
FIG. 2 is a rear elevational view of an interchangeable lens to be mounted on the camera body of FIG. 1.

Referring now to the drawings, as one example of an optical apparatus equipped with a positioning mechanism and including a main optical device and an auxiliary optical device detachably coupled with each other by a known bayonet mount mechanism, there is shown in FIGS. 1 to 5, a photographic camera K1 according to a first embodiment of the present invention, which includes an interchangeable lens 1 acting as the auxiliary optical device and a camera body 2 acting as the main optical device. The interchangeable lens 1 is detachably mounted on the camera body 2 by rotating the interchangeable lens 1. The camera K1 further includes a driven shaft 4, a lens driving shaft 5 engageable with the driven shaft 4 and a positioning member 7. The driven shaft 4 is provided in a first through-hole 3d formed on a mount face 3b of a mount member of the interchangeable lens 1. The lens driving shaft 5 is provided in a second through-hole 3c formed on a mount face 3a of a mount member of the camera body 2 and is retractably displaced in the direction of the optical axis of the camera body 2 from a predetermined position on the mount face 3a of the mount member of the camera body 2 so as to be brought into and out of engagement with the driven shaft 4. Meanwhile, a positioning recess 6 is formed on the mount face 3b of the interchangeable lens 1. The positioning member 7 is provided in the camera body 2 and is retractably displaced in the direction of the optical axis of the camera body 2 from a predetermined position on the mount face 3a of the mount member of the camera body 2 so as to be brought into and out of engagement with the positioning recess 6.

Figure 3:
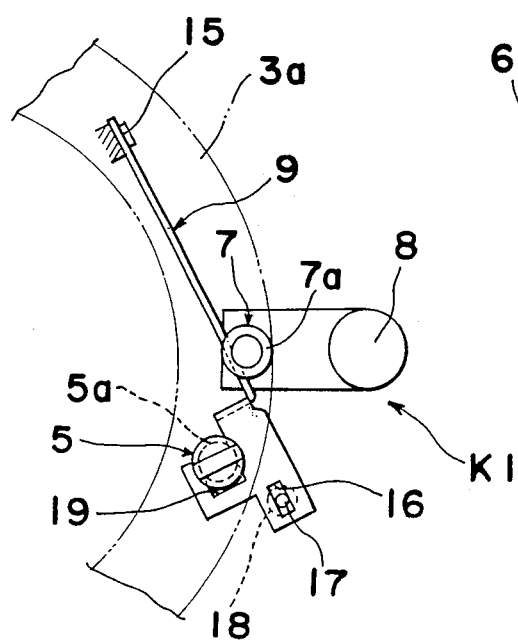
FIG. 3 is a fragmentary front elevational view of the camera body of FIG. 1.
Figure 4:
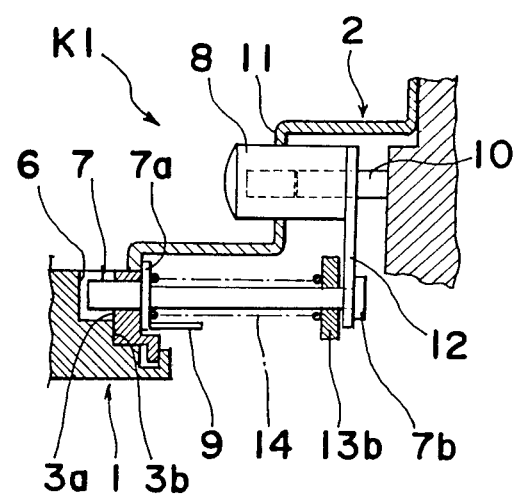
FIG. 4 is a fragmentary cross-sectional view of the camera body of FIG. 1.

Furthermore, the camera K1 includes an unlocking member 8 for disengaging the lens driving shaft 5 and the positioning member 7 from the driven shaft 4 and the positioning recess 6, respectively by manipulating the unlocking member 8 externally, and a coupling member 9. As shown in FIGS. 3 and 4, upon a disengaging operation, i.e., depression of the unlocking member 8, retractive displacement of the positioning member 7 is operatively associated with retractive displacement of the lens driving shaft 5 by the coupling member 9. As shown in FIG. 4, the unlocking member 8 is slidably fitted, at its blind hole, around a guide rod 10 provided, adjacent to the mount face 3a, at a predetermined position in the camera body 2 so as to be retractably displaced from a front cover 11 of the camera body 2 in the forward and rearward directions of the camera body 2. Meanwhile, a coupling plate 12 is secured to a rear end of the unlocking member 8 so as to extend behind the mount face 3a.

The positioning member 7 is so supported as to extend through the mount member of the camera body 2 and a fixed member 13b secured to the camera body 2 and is further fitted through a hole of the coupling plate 12. The positioning member 7 is formed, at its rear end portion, with a flange 7b such that the flange 7b is held in contact with the coupling plate 12. Upon the disengaging operation, i.e., depression of the unlocking member 8, the positioning member 7 is displaced in the rightward direction in FIG. 4 by the coupling plate 12 so as to be disengaged from the positioning recess 6 formed on the mount face 3b of the interchangeable lens 1. Meanwhile, a compression coiled spring 14 wound around the positioning member 7 is arranged between a flange 7a formed on the positioning member 7 and the fixed member 13b so as to urge the positioning member 7 in the forward direction of the camera body 2 such that the positioning member 7 is brought into engagement with the positioning recess 6 upon completion of a mounting operation of the interchangeable lens 1.

Figure 5:
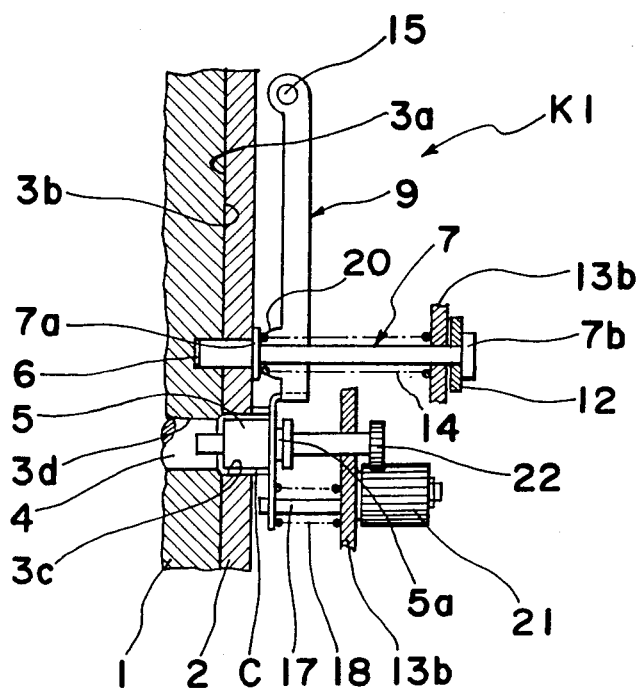
FIG. 5 is a fragmentary cross-sectional view showing the interchangeable lens of FIG. 2 mounted on the camera body of FIG. 1.

As shown in FIGS. 3 and 5, the coupling member 9 is pivotally mounted, at its one end portion, on the camera body 2 by a pivot 15, while a guide pin 17 screwed into the fixed member 13b is inserted through a guide slit 16 formed at the other end portion of the coupling member 9, such that the coupling member 9 is pivoted in the forward and rearward directions of the camera body 2, i.e., in the direction of the optical axis of the camera body 2. A compression coiled spring 18 wound around the guide pin 17 is arranged so as to urge the coupling member 9 in the forward direction of the camera body 2. The coupling member 9 is formed, at the other end portion, with a U-shaped fork portion 19. The fork portion 19 is fitted around a circumferential groove 5a of the lens driving shaft 5. Meanwhile, the coupling member 9 is formed, between the fork portion 19 and its one end portion supported by the pivot 15, with a semicircular projection 20 which is held in contact with the rear face of the flange 7a by an urging force of the coiled spring 18. Thus, upon retraction of the positioning member 7, the coupling member 9 is pivoted in the rearward direction of the camera body 2 against the urging force of the coiled spring 18, so that the lens driving shaft 5 held in engagement with the fork portion 19 of the coupling member 9 is displaced in the rearward direction of the camera body 2.

The lens driving shaft 5 is so supported as to extend, at its rear end portion, through the fixed member 13b of the camera body 2 and is loosely fitted into the second through-hole 3c formed on the mount face 3a of the mount member of the camera body 2 so as to define a clearance C therebetween. A driven gear 22 is mounted on the rear end portion of the lens driving shaft 5 so as to be in mesh with a driving gear 21 mounted on a rod supported on the rear face of the fixed member 13b. Rotation of a motor (not shown) whose drive is controlled by a focus control device (not shown) incorporated in the camera body 2 is transmitted to the driving gear 21 through an arbitrary transmission mechanism and then, rotation of the driving gear 21 is transmitted to the lens driving shaft 5 via the driven gear 22.

Hereinbelow, states of projection of the positioning member 7 into the positioning recess 6 at the time of mounting the interchangeable lens 1 on the camera body 2 will be described with reference to FIGS. 6a to 6d. Initially, upon the mounting operation of the interchangeable lens 1, the positioning member 7 is caused to start projecting from the mount face 3a of the mount member of the camera body 2 into the positioning recess 6 of the mount face 3b of the mount member of the interchangeable lens 1 by the urging force of the coiled spring 14. Supposing here that character m represents a mass of the positioning member 7, character k represents a spring constant of the coiled spring 14, character a represents an initial urging force applied to the positioning member 7 by the coiled spring 14, character $\mu$ represents a coefficient of friction caused by projection of the positioning member 7 into the positioning recess 6, character y represents a projecting amount of the positioning member 7 into the positioning recess 6, which projecting amount y is measured in the projecting direction of the positioning member 7 from its projecting start position set at an origin and character t represents a time period required for projection of the positioning member 7 into the positioning recess 6, which time period t is measured from start of projection of the positioning member 7 into the positioning recess 6, the positioning amount y is expressed by the following equation (1):

$$y = \frac{a}{k}\left[1 - \cos\left(\sqrt{(1-\mu)\cdot\frac{k}{m}} \cdot t\right)\right] \quad (1)$$

Figure 6A:
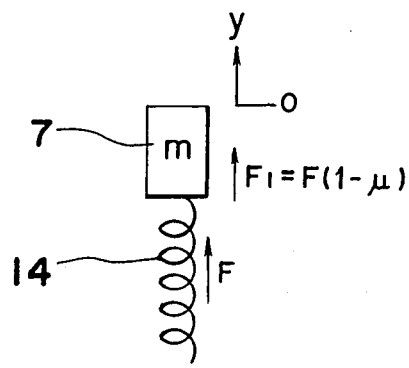
FIG. 6a is a schematic view showing projecting behavior of a positioning member provided in the camera body of FIG. 1.

The above equation (1) is obtained as follows. Namely, a dynamic model of the positioning member 7 and the coiled spring 14 is illustrated as shown in FIG. 6a. Assuming that character F represents the urging force of the coiled spring 14, a force $F_1$ applied actually to the positioning member 7 is given by:

$$F_1 = F(1-\mu) \quad (2)$$

It is supposed here that the damping force $\mu F$ assumes a value of zero when the urging force F is zero, namely when the coiled spring 14 is loosened to its free condition. Even when the coiled spring 14 is of its free condition, the damping force is not actually zero. However, in this analysis, an operating range of the coiled spring 14, in which the coiled spring 14 can be actuated sufficiently without being loosened to its free condition, is considered.

Meanwhile, the urging force F of the coiled spring 14 can be expressed by:

$$F = a - ky \quad (3)$$

Furthermore, a kinematic equation of the force $F_1$ is given by:

$$F_1 = m \cdot \frac{d^2y}{dt^2} \quad (4)$$

By eliminating the characters F and $F_1$ from equations (2), (3) and (4), the following equation (5) is obtained:

$$(1-\mu)\cdot(a-ky) = m \cdot \frac{d^2y}{dt^2} \quad (5)$$

In order to simplify equation (5), coordinate transformation from the coordinate axis y to a coordinate axis X is performed as follows:

$$(1-\mu)\cdot(a-ky) = -KX \quad (6)$$

$$\frac{d^2X}{dt^2} = (1-\mu)\cdot\frac{k}{K}\cdot\frac{d^2y}{dt^2} \quad (7)$$

By substituting equations (6) and (7) for equation (5), the following equation (8) is obtained:

$$\frac{d^2X}{dt^2} + \frac{(1-\mu)}{m}\cdot k \cdot X = 0 \quad (8)$$

This equation (8) is a so-called ordinary differential equation of second order and therefore, is solved as follows:

$$X = C_1 \sin\left(\sqrt{(1-\mu)\cdot\frac{k}{m}} \cdot t\right) + C_2\cos\left(\sqrt{(1-\mu)\cdot\frac{k}{m}} \cdot t\right) \quad (9)$$

where characters $C_1$ and $C_2$ represent constants, respectively.

By transforming equation (9) into the original coordinate system of the coordinate axis y, the following equation (10) is obtained.

$$y = C_1\sin\left(\sqrt{(1-\mu)\cdot\frac{k}{m}} \cdot t\right) + C_2\cos\left(\sqrt{(1-\mu)\cdot\frac{k}{m}} \cdot t\right) + \frac{a}{k} \quad (10)$$

By supposing such initial conditions as $y=0$ and $(dy/dt)=0$ at $t=0$, the constants $C_1$ and $C_2$ are found to be as follows:

$$C_1 = 0$$
$$C_2 = -a/k \qquad (11)$$

By substituting these values of the constants $C_1$ and $C_2$ of equation (11) for equation (10), the above described equation (1) can be obtained. Thus, equation (1) is a kinematic equation of the positioning member 7, in which the projecting amount y is set at zero when the positioning member 7 is disposed at the projecting start position.

Meanwhile, equation (1) clearly indicates simple harmonic motion. On the other hand, generally, motions associated with friction should be damped oscillation due to the energy loss. This discrepancy arises from the fact that equation (2) is employed. Thus, more strictly, the term (a/k) of equation (1) should be multiplied by a damping term. However, since only the initial motion of the damped oscillation is considered in this analysis as described earlier, the damping term can be neglected in this case. This approximation does not adversely affect the analysis practically but it is needless to say that equation (1) can be expressed more strictly by employing the damping term, if necessary. Relation between the projecting amount y of the positioning member 7 expressed by equation (1) and the time period t in the case where an operator rapidly mounts the interchangeable lens 1 on the camera body 2 is illustrated as shown by a projecting line A in FIG. 6b. It will be readily seen from the projecting line A of FIG. 6b that the projecting amount y per unit time period, i.e., projecting speed of the mounting member 7 is low at an initial stage but gradually increases with lapse of the time period t.

Figure 6B:
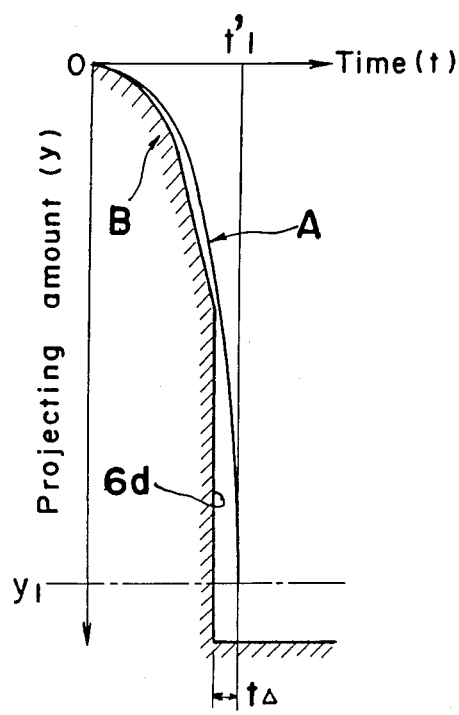
Figure 6C:
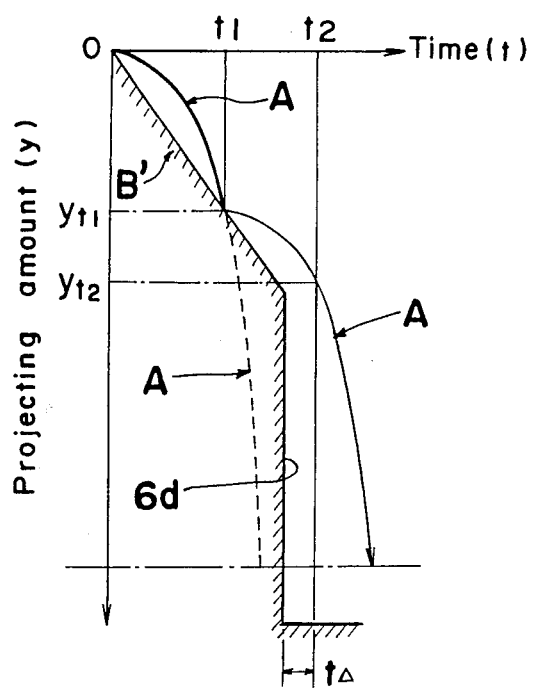

The present inventors have found that if the positioning recess 6 is so formed as not to interfere with the projecting line A, the projecting amount y of the positioning member 7 increases as described in detail hereinbelow. In FIGS. 6b and 6c, a left side face (i.e., front side facing being at the front side with respect to the direction of rotation of the interchangeable lens 1 relative to the camera body 2 for the mounting of the former on the latter) of the positioning recess 6 has contour lines B and B' relative to the time period t, respectively. Of course, as shown in the drawing figures, the front side face of the positioning member is on the left and the rear side face is on the right. In FIG. 6b, the contour line B of the positioning recess 6 is disposed at the left side of the projecting line A of the positioning member 7. In contrast, in FIG. 6c, the contour line B' is partially disposed at the right side of the projecting line A. It is to be noted that in FIGS. 6b to 6d, character $t\Delta$ represents a time period into which a sidewise clearance $\Delta$ between the positioning member 7 and the positioning recess 6 held in engagement with each other is converted by the rotational mounting speed of the interchangeable lens 1. In FIG. 6c, the positioning member 7 starts projecting from the mount face 3b of the interchangeable lens 1 into the positioning recess 6 at the time of $t=0$. Subsequently, when the projecting amount y assumes a value of $y_{t1}$ at the time $t_1$, the projecting line A intersects with the contour line B', namely the positioning member 7 collides with an inclined left (front) side face of the positioning recess 6, so that its projection is once interrupted. Then, at the time $t_2$, the positioning member 7 proceeds to a position spaced the clearance $\Delta$ (corresponding to the time period $t\Delta$) from an engageable portion 6d of the position recess 6 and collides with an opposite engageable portion of the right side face (i.e., rear side face being at the rear side with respect to the direction of the rotation of the interchangeable lens 1 relative to the camera body 2 for the mounting of the former on the latter) of the positioning recess 6, thus resulting in completion of mounting of the interchangeable lens 1 on the camera body 2 with positioning. Again, as shown in the drawings, the front side face of the positioning member is on the left and the rear side face is on the right. At this moment, the projecting amount y assumes a value of $y_{t2}$. In other words, during a time duration from the time $t_1$ to the time $t_2$, the positioning member 7 is projected through a distance of $(y_{t2}-y_{t1})$ into the positioning recess 6. Therefore, in the case where the contour line B' of the positioning recess 6 is disposed at the right side of the projecting line A of the positioning member 7 as shown in FIG. 6c, the projecting member 7 collides with the inclined left (front) side face of the positioning recess 6 while projecting into the positioning recess 6 and then, slowly projects into the positioning recess 6 along a small curvature, so that the projecting amount y as a whole becomes small.

On the other hand, in FIG. 6b, the positioning member 7 projects into the positioning recess 6 along the projecting line A. In FIG. 6b, at the time $t'_1$, the positioning member 7 proceeds to a position spaced the clearance $\Delta$ (corresponding to the time period $t\Delta$) from the engageable portion 6d of the positioning recess 6 and collides with the opposite engageable portion 6e (see FIG. 7) of the positioning recess 6, thus resulting in completion of mounting of the interchangeable lens 1 on the camera body 2 with positioning. At the time $t'_1$, the projecting amount y assumes a value of $y_1$. In this case, the positioning member 7 projects into the positioning recess 6 without colliding with any part of the left (front) side face of the positioning recess 6. Thus, the projecting amount y per unit time period, i.e., the projecting speed of the projecting member 7 is low at an initial stage of the projecting line A but increases with lapse of the time period t. Consequently, the projecting amount y assuming finally the predetermined value of $y_1$ in FIG. 6b becomes larger than that in FIG. 6c.

Figure 6D:
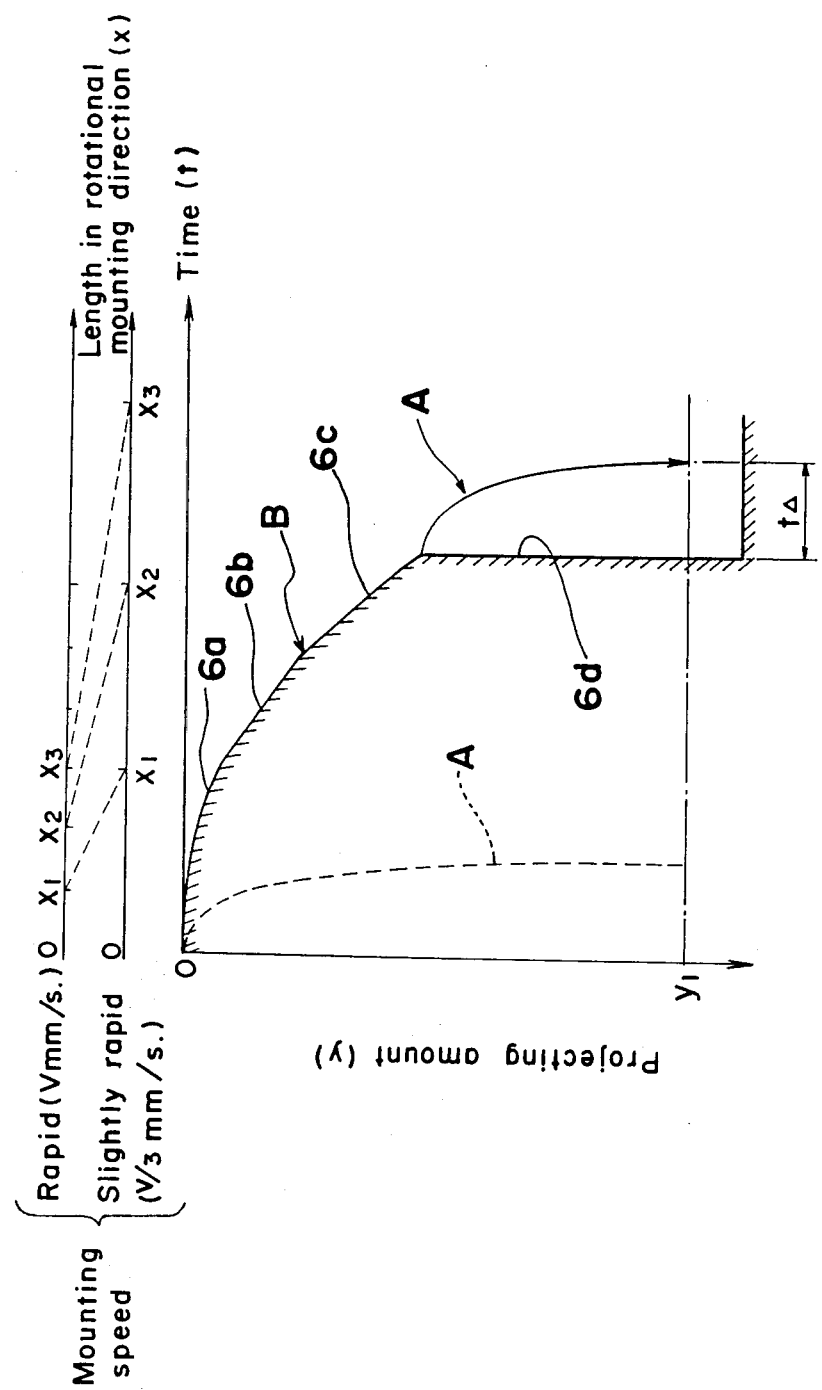

In FIG. 6b, the contour of the positioning recess 6 of the interchangeable lens 1 is schematically illustrated. More specifically, as shown in FIG. 6d, the positioning recess 6 is provided with a convex arcuate portion 6a formed at the periphery of a corner of the mount face 3b, inclined portions 6b and 6c and the engageable portion 6d formed on its left (front) side face continuously and sequentially from the mount face 3b and with the engageable portion 6e formed on its opposite right (rear) side face from the mount face 3b. The inclined portions 6b and 6c are inclined at angles of not less than 60° with respect to the mount face 3b. It was found experimentally that the contour line B of the positioning recess 6 is disposed at the left side of the projecting line A of the positioning member 7 as shown in FIG. 6b in the case of rapid mounting of the interchangeable lens 1 on the camera body 2 and thus, the interchangeable lens 1 can be mounted on the camera body 2 positively and reliably, The convex arcuate portion 6a and the inclined portions 6b and 6c are not brought into contact with the positioning member 7 while the positioning member 7 is projecting into the positioning recess 6. The convex arcuate portion 6a extends at a small angle with the mount face 3b, while the inclined portions 6b and 6c extend at large angles with the mount face 3b, respectively. Meanwhile, the positioning member 7 has a straight portion at its spherical surface, which portion extends in the longitudinal direction (i.e., the direction of its projection from the mount face 3a of the mount member of the camera body 2) to form a substantially right angle edge in FIGS. 7a to 7d at a distal end thereof. The inclination of the inclined portion 6c is larger than that of the inclined portion 6b.

Figure 7A:
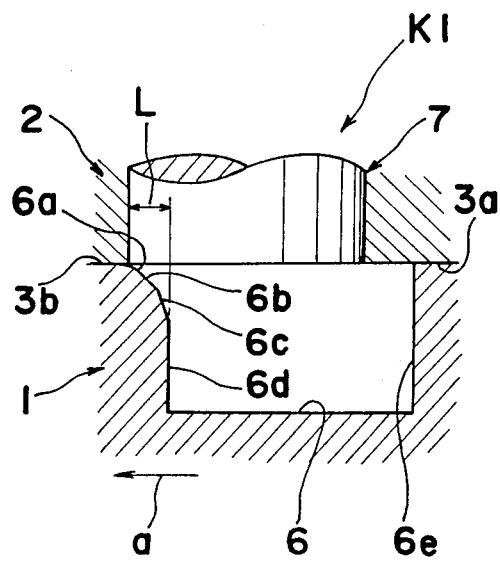
Figure 7B:
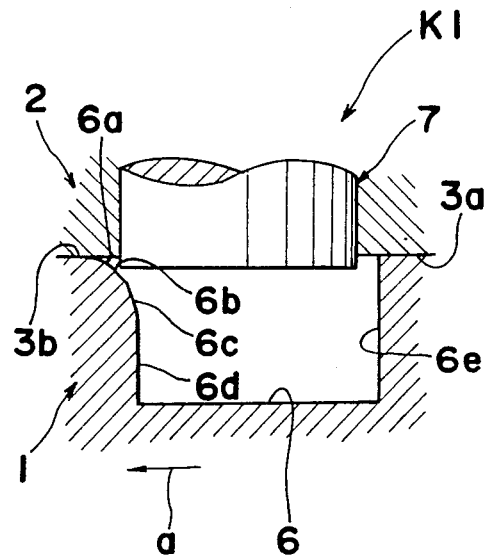
Figure 7C:
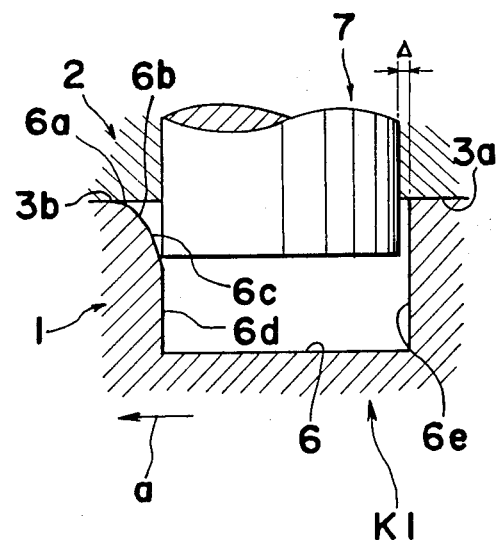
Figure 7D:
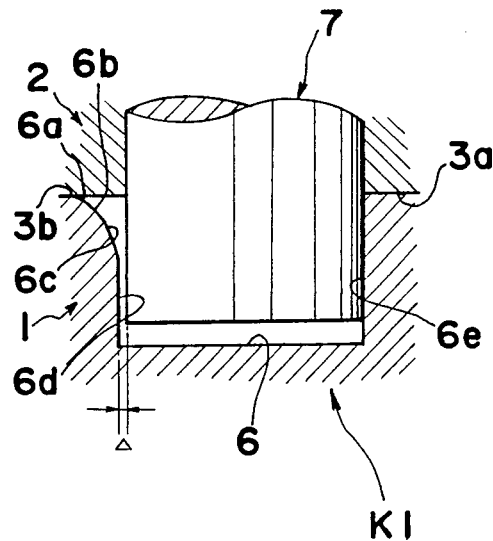

FIGS. 7a to 7d show sequentially the manner of the projection of the positioning member 7 of the camera body 2 from the mount face 3b of the interchangeable lens 1 into the positioning recess 6 upon rapid mounting of the interchangeable lens 1 on the camera body 2. In FIG. 7a, the positioning member 7 is allowed to project into the positioning recess 6 from the mount face 3b of the interchangeable lens 1 by the urging force of the coiled spring 14. When the interchangeable lens 1 is rotated relative to the camera body 2 in the direction indicated by the arrow a parallel with the mount faces 3a and 3b from the condition shown in FIG. 7a, the positioning member 7 starts projecting into the positioning recess 6 at a relatively slow speed without colliding with the convex arcuate portion 6a and the inclined portions 6b and 6c as shown in FIG. 7b. Thereafter, as shown in FIG. 7c, the positioning member 7 having passed by the inclined portion 6c without colliding with the inclined portion 6c further projects towards the bottom of the positioning recess 6 at a projecting speed faster than the initial projecting speed. Finally, when the positioning member 7 has projected through the predetermined projecting amount into the positioning recess 6 so as to collide with the engageable portion 6e as shown in FIG. 7d, the positioning member 7 is spaced the clearance Δ from the engageable portion 6d.

In the case where the operator mounts the interchangeable lens 1 on the camera body 2 slowly or slightly rapidly, the positioning member 7 is caused to start projecting into the positioning recess 6 from the mount face 3b by the urging force of the coiled spring 14. However, in this case, since the contour line B of the positioning recess 6 becomes angularly gentler than the projecting line A of the positioning member 7 as shown in FIG. 6d, the positioning member 7 projects contacting with the convex arcuate portion 6a and the inclined portions 6b and 6c sequentially, into the positioning recess 6. When the positioning member 7 has reached a point of intersection between the inclined portion 6c and the engageable portion 6d, the positioning member 7 proceeds away from the point of intersection between the inclined portion 6c and the engageable portion 6d so as to project further into the positioning recess 6 along the projecting line A. Since the mounting speed of the interchangeable lens 1 is not extremely high at this time, the time period tΔ during which the projecting member 7 is displaced through the clearance Δ from the engageable portion 6d becomes relatively long as shown in FIG. 6d. Accordingly, the positioning member 7 can be sufficiently projected through the predetermined projecting amount $y_1$ into the positioning recess 6 during the time period tΔ. Namely, when the positioning member 7 collides with the engageable portion 6e, the projecting amount y has already reached the predetermined value of $y_1$.

Figure 8A:
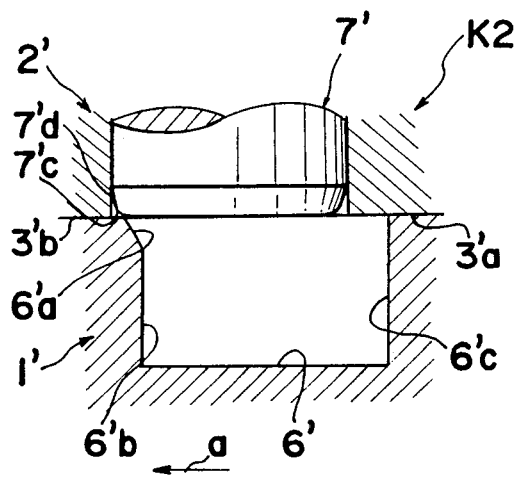
FIGS. 8a, 8b, 8c and 8d are views similar to FIGS. 7a, 7b, 7c and 7d, respectively, particularly showing a second embodiment of the present invention.
Figure 8B:
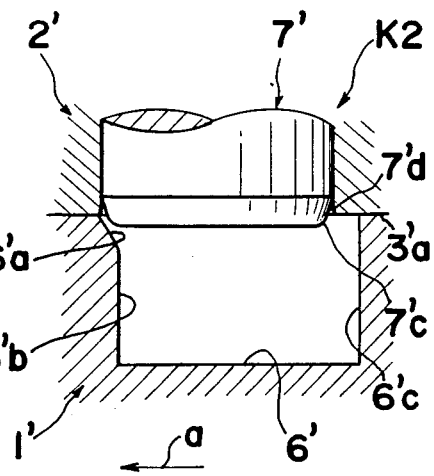
Figure 8C:
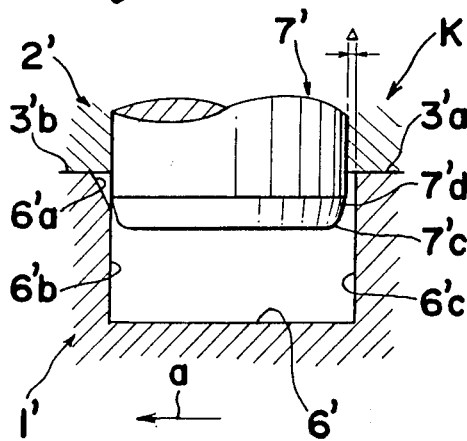
Figure 8D:
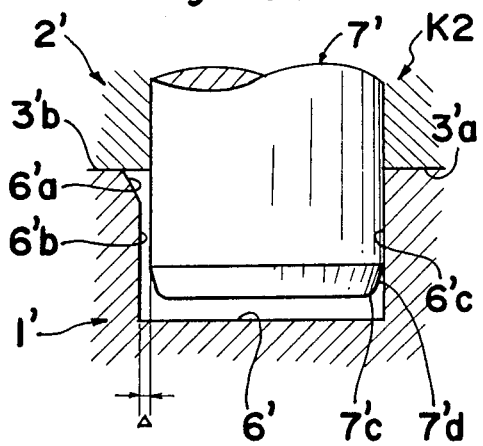

Referring to FIGS. 8a to 8d, there is shown a photographic camera K2 according to a second embodiment of the present invention. The camera K2 includes an interchangeable lens 1' and a camera body 2'. In the same manner as the camera K1, a positioning member 7' is adapted to project from a mount face 3'b of the mount member of the interchangeable lens 1' into engagement with a positioning recess 6' in the camera K2. However, in the camera K2, the positioning recess 6' is provided with an inclined portion 6'a and an engageable portion 6'b formed on its left (front) side face sequentially from the mount face 3'b and with an engageable portion 6'c formed on its opposite right (rear) side face. The inclined portion 6'a is inclined at an angle of not less than 60° with respect to the mount face 3'b. Furthermore, in the camera K2, the convex arcuate portion 6a and the inclined portions 6b and 6c formed on the positioning recess 6 of the camera K1 are replaced by a convex arcuate portion 7'c and an inclined portion 7'd which are sequentially formed from a flat distal end of the positioning member 7' such that the inclined portion 7'd is inclined at an angle of not less than 60° with respect to the mount face 3'a of the mount member of the camera body 2', i.e., with respect to the direction of the arrow a. Here, the inclination of the inclined portion 7'd with respect to the mount face 3'a is steeper than that of the inclined portion 6'a with respect to the mount face 3'b. Since other constructions of the camera K2 are the same as those of the camera K1, description thereof is abbreviated for the sake of brevity. When the interchangeable lens 1' is rapidly mounted on the camera body 2', the contour line of the positioning recess 6' and the projecting line of the positioning member 7' are produced in the same manner as the contour line B and the projecting line A of the camera K1, respectively. Accordingly, when the interchangeable lens 1' is rapidly mounted on the camera body 2' by rotating the interchangeable lens 1' relative to the camera body 2' in the direction indicated by the arrow a, the positioning member 7', in the same manner as the projecting procedures of the positioning member 7 in FIGS. 7a to 7d, projects into the positioning recess 6' without collision of the convex arcuate portion 7'c and the inclined portion 7'd with the inclined portion 6'a as shown in FIGS. 8a to 8c. Finally, as shown in FIG. 8d, when the positioning member 7' has projected through the predetermined projecting amount into the positioning recess 6', the positioning member 7' is spaced the clearance Δ from the engageable portion 6'b so as to collide with the engageable portion 6'c.

Even if the operator mounts the interchangeable lens 1' on the camera body 2' slowly or slightly rapidly, the projecting member 7' projects into the positioning recess 6' through contact of the convex arcuate portion 7'c with the inclined portion 6'a of the positioning recess 6'. When the positioning member 7' has projected through the ppredetermined projecting amount into the projecting recess 6', the positioning member 7' is spaced the clearance Δ from the engageable portion 6'b so as to collide with the engageable portion 6'c in the same manner as the camera K1.

Figure 9:
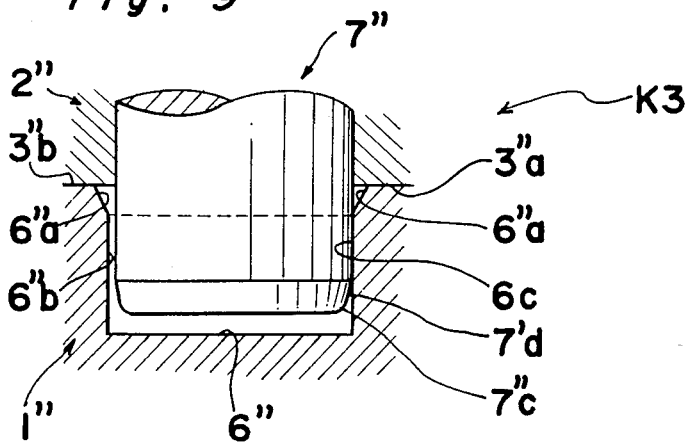
FIG. 9 is a view similar to FIG. 8d, particularly showing a third embodiment of the present invention.

Referring further to FIG. 9, there is shown a photographic camera K3 according to a third embodiment of the present invention, which includes an interchangeable lens 1'' and a camera body 2''. In the camera K3, an inclined portion 6''a is formed along a peripheral edge of a positioning recess 6'' by, for example, countersinking so as to facilitate machining of the positioning recess 6''a. Since other constructions of the camera K3 are the same as those of the camera K2, description thereof is abbreviated for the sake of brevity. By the above described arrangement of the camera K3, even when the interchangeable lens 1" is mounted on the camera body 2" either rapidly or slowly, a positioning member 7" fully projects into the positioning recess 6" in exactly the same manner as the camera K2.

In the positioning mechanism of FIG. 5 in which the lens driving shaft 5 is operatively associated with the positioning member 7 so as to be engaged with the driven shaft 4, the lens driving shaft 5 is positively brought into engagement with the driven shaft 4. Namely, even when the interchangeable lens 1 is rapidly mounted on the camera body 2, the positioning member 7 positively projects through the predetermined projecting amount into the positioning recess 6. Accordingly, since the coupling member 9 is pivoted clockwise in the forward direction by the urging force of the coiled spring 18, the lens driving shaft 5 is displaced towards the driven shaft 4 so as to be positively brought into engagement with the driven shaft 4. When the unlocking member 8 shown in FIGS. 3 and 4 is depressed to allow dismounting of the interchangeable lens 1 from the camera body 2, the positioning member 7 is disengaged from the positioning recess 6 against the urging force of the coiled spring 14 so as to be retracted from the mount face 3b towards the camera body 2. Also the lens driving shaft 5 is disengaged from the driven shaft 4 by the coupling member 9 coupled with the positioning member 7 so as to be retracted from the mount face 3b towards the camera body 2. This makes it possible to dismount the interchangeable lens 1 from the camera body 2. If in this case the interchangeable lens 1 is rotated relative to the camera body 2 in the direction opposite to the arrow a for demounting from the camera body 2 without completely depressing of the unlocking member 8, the interchangeable lens 1 becomes movable relative to the camera body 2 through a sidewise length L (FIG. 7a) of the convex arcuate portion 6a and the inclined portions 6b and 6c with the driven and driving shafts kept in engagement with each other. Since the permissible clearance (gap) C of FIG. 5 is set to be larger than a sum of the sidewise length L, the clearance Δ and a tolerance, the lens driving shaft 5 is not forced to contact with a peripheral face of the second through-hole 3c formed on the mount face 3a, so that the rotational force to demount the interchangeable lens 1 is not applied, through the driven and driving shafts 4 and 5, to the peripheral face of the second through-hole 3c. The driving shaft 5 is prevented from being damaged.

Figure 10:
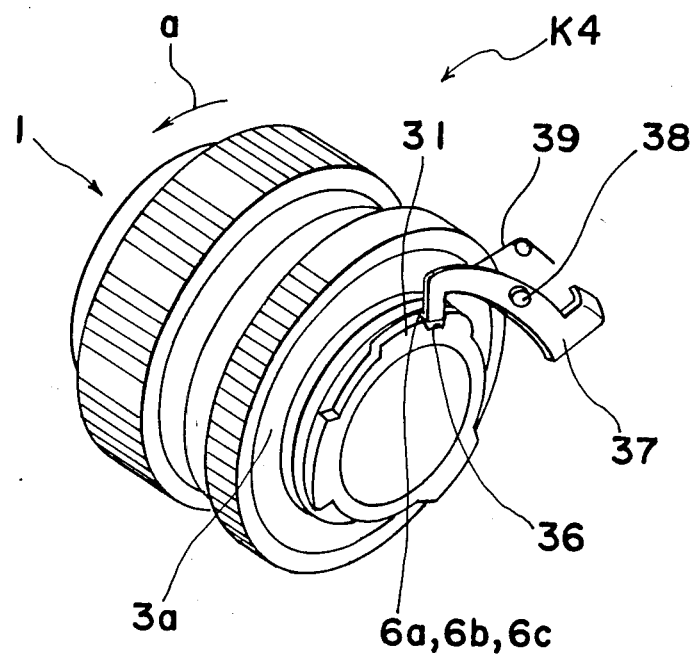
FIG. 10 is a perspective view of a photographic camera according to a fourth embodiment of the present invention.
Figure 11:
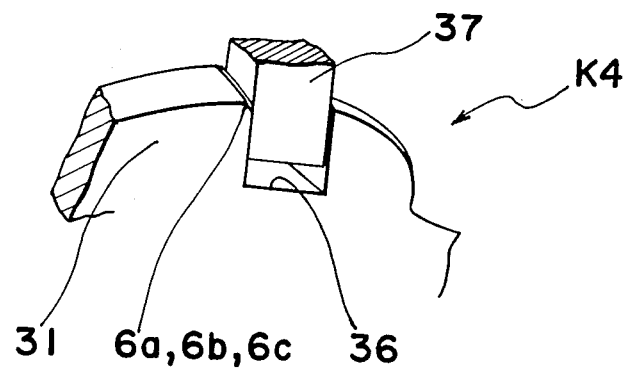
FIG. 11 is an enlarged detail view of the photographic camera of FIG. 10.

Referring finally to FIGS. 10 and 11, there is shown a photographic camera K4 according to a fourth embodiment of the present invention. In the camera K4, a bayonet pawl 31 of the interchangeable lens 1 has a radially extending positioning recess 36 formed at an outer peripheral portion thereof such that a positioning lever 37 acting as a positioning member is brought into engagement, at its distal end, with the positioning recess 36. The positioning lever 37 is pivotally supported by a fixed pin 38 secured to the camera body (not shown) and is subjected to an urging force of a spring 39. The positioning recess 36 is provided with the convex arcuate portion 6a and the inclined portions 6b and 6c in the same manner as that of the camera K1. In this embodiment, although the positioning lever 37 is not operatively associated with the lens driving shaft (not shown), it is also possible to operatively associate the positioning lever 37 with the lens driving shaft.

It is needless to say that optical apparatuses to which the present invention may be applied are not restricted to the photographic camera of the above described embodiments including the camera body acting as the main optical device and the interchangeable lens acting as the auxiliary optical device. Furthermore, in addition to the interchangeable lens, an extension ring, a rear conversion lens, etc., which are mating optical devices of the camera body, can also be employed as the auxiliary optical device. Moreover, the present invention can be applied to a single lens reflex camera, a lens interchange type rangefinder camera, a video camera, a projector, an enlarger, etc.

As is clear from the foregoing description, in accordance with the present invention, the positioning member and the positioning recess have a configuration which allows the positioning member to engage in the positioning recess without causing a front side face of the positioning member to contact with a front side face of the positioning recess when an auxiliary optical device is mounted on a main optical device at a speed faster than a predetermined speed. The configuration conforms to such a projecting characteristic of the positioning member that the projecting speed of the positioning member is low initially but rises later. Thus, in the case where the auxiliary optical device is rapidly mounted on the main optical device, the positioning member projects through the predetermined projecting amount into the positioning recess so as to be positively brought into engagement with the positioning recess. Therefore, even if the auxiliary optical device is frequently mounted on or dismounted from the main optical device, inaccurate positioning of the auxiliary optical device relative to the main optical device does not take place, which inaccurate positioning would otherwise result from increase of the play between the positioning member and the positioning recess or from skip of the positioning member over the positioning recess due to denting or deformation of the positioning member and the positioning recess. Consequently, in the case of the camera, such inconveniences as improper exposure, inaccurate transmission of signals, etc. can be obviated.

Meanwhile, in the case where drive transmission between the main and auxiliary optical devices is performed, damage to the engageable portions for the drive transmission, malfunctions of the drive transmission mechanism, etc. can be prevented. Furthermore, since it is unnecessary to issue a warning signal or make the optical apparatus inoperative in the case of insufficient engagement of the positioning member with the positioning recess, rise of the production cost of the optical apparatus or increase of size of the optical apparatus can be avoided.

Furthermore, in accordance with the present invention, the clearance between the lens driving shaft and the second through-hole is set to be larger than the clearance between the positioning member and the positioning recess allowing sidewise displacement of the auxiliary optical device relative to the main optical device. Accordingly, in the case where the drive transmission shaft is interconnected with the positioning member for its simultaneous projection with the positioning member, the engageable portion of the drive transmission shaft is not subjected to an additional force, thereby preventing damage to the engageable portion of the drive transmission shaft, malfunctions of the drive transmission mechanism, etc.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A positioning mechanism for positioning an auxiliary optical device relative to a main optical device when mounting of said auxiliary optical device on said main optical device completes through movement of said auxiliary optical device relative to said main optical device in a predetermined direction with mount members of said main and auxiliary optical devices being in contact with one another, said mechanism comprising:

a positioning member provided on said main optical device and urged to project from said mount member of said main optical device;

a positioning recess provided on the mount member of said auxiliary optical device and having a width allowing engagement of said positioning member with a predetermined clearance, said positioning member and said positioning recess respectively including a front side face portion being at the front side with respect to the direction of said relative movement of said auxiliary optical device and a rear side face portion being opposite to and in alignment with said front side face portion in the direction of said relative movement of said auxiliary optical device such that said engagement starts due to the urging of said positioning member immediately after said front side face portions of said positioning member and said positioning recess come in alignment with one another as a result of said relative movement of said auxiliary optical device and such that said rear face portions of said positioning member and positioning recess come into contact with one another with said clearance interposed between said front face portions of said positioning member and positioning recess when said engagement completes, and said front face portions of said positioning member and said positioning recess having a configuration which allows said front face portions not to contact one another during the advancement of said engagment when said relative movement of said auxiliary optical device is effected at a speed faster than a predetermined speed;

said configuration including:

a convex arcuate portion formed on said front side face portion of said positioning recess at an entrance part thereof;

a first straight slope portion formed on said front side face portion of said positioning recess at an inner portion thereof which is consecutive with said convex arcuate portion, said first straight slope portion having an inclination of not less than 60° with respect to the direction of said relative movement of said auxiliary optical device; and a straight portion provided on at least said front side face portion of said positioning member and extending in the longitudinal direction of said positioning member perpendicular to said mount member of said main optical device, said straight portion forming a substantially right angle edge in a front elevational view at a distal end of said positioning member.

2. A positioning mechanism as defined in claim 1, wherein said configuration further includes a second straight slope portion formed on said front side face portion of said positioning recess at an inner part thereof which is consecutive with said first straight slope portion, said second straight slope portion having an inclination of not less than 60° with respect to the direction of said relative movement of said auxiliary optical device.

3. A positioning mechanism as defined in claim 2, wherein the inclination of said second straight slope portion is larger than that of said first straight slope portion.

4. A positioning mechanism for positioning an auxiliary optical device relative to a main optical device when mounting of said auxiliary optical device on said main optical device completes through movement of said auxiliary optical device relative to said main optical device in a predetermined direction with mount members of said main and auxiliary optical devices being in contact with one another, said mechanism comprising:

a positioning member provided on said main optical device and urged to project from said mount member of said main optical device;

a positioning recess provided on the mount member of said auxiliary optical device and having a width allowing engagement of said positioning member with a predetermined clearance, said positioning member and said positioning recess respectively including a front side face portion being at the front side with respect to the direction of said relative movement of said auxiliary optical device and a rear side face portion being opposite to and in alignment with said front side face portion in the direction of said relative movement of said auxiliary optical device such that said engagement starts due to the urging of said positioning member immediately after said front side face portions of said positioning member and said positioning recess come in alignment with one another as a result of said relative movement of said auxiliary optical device and such that said rear face portions of said positioning member and positioning recess come into contact with one another with said clearance interposed between said front face portions of said positioning member and positioning recess when said engagement completes, and said front face portions of said positioning member and said positioning recess having a configuration which allows said front face portions not to contact one another during the advancement of said engagement when said relative movement of said auxiliary optical device is effected at a speed faster than a predetermined speed;

said configuration including:

a convex arcuate portion formed on at least said front side face portion of said positioning member at a distal end thereof;

a first straight slope portion formed on said front side face portion of said positioning member at a position consecutive with said convex arcuate portion and having an inclination of not less than 60° with respect to the direction of said relative movement of said auxiliary optical device; and a second straight slope portion formed on at least said front side face of said positioning recess at an entrance part thereof and having an inclination of not less than 60° with respect to the direction of said relative movement of said auxiliary optical device.

5. A positioning mechanism as defined in claim 4, wherein said auxiliary optical device includes a driven shaft provided in a first through-hole formed on said mount face of said mount member of said auxiliary optical device, and wherein said main optical device includes a driving shaft urged to project from the mount face of said mount member of said main optical device for coupling with said driven shaft and means for interconnecting said driving shaft with said positioning member so that said driving shaft is allowed to project from the mount face of said mount member of said main optical device when said positioning member engages said positioning recess on the course of said relative movement of said auxiliary optical device.

6. A positioning mechanism as defined in claim 5, wherein said mount member of said main optical device is formed with a second through-hole in which said driving shaft is fit with a clearance which is wider than said clearance of said engagement of said positioning member with said positioning recess.

7. A positioning mechanism as defined in claim 4, wherein said convex arcuate portion is formed at the periphery of the corner at the distal end of said positioning member.

8. A positioning mechanism as defined in claim 7, wherein said first straight slope portion is formed at the side face of said positioning member including said leading and rear side faces.

9. A positioning mechanism as defined in claim 8, wherein said second straight slope portion is formed at the periphery of the entrance part of said positioning recess.

10. A positioning mechanism as defined in claim 4, wherein said main optical device is a camera body.

11. A positioning mechanism as defined in claim 10, wherein said auxiliary optical device is an interchangeable lens.

12. A positioning mechanism as defined in claim 10, wherein said auxiliary optical device is an extension ring.

13. A positioning mechanism as defined in claim 10, wherein said auxiliary optical device is a rear conversion lens.

14. An auxiliary optical device which is detachably mountable on a main optical device through movement of the former relative to the latter with their mount faces being in contact with one another, wherein said main optical device includes a positioning member urged to project from the mount face of said main optical device to engage a positioning recess formed on the mount member of said auxiliary optical device with a predetermined clearance, said auxiliary optical device comprising:

a convex arcuate portion formed at an entrance part of said positioning recess on at least the front side thereof with respect to the direction of the relative movement of said auxiliary optical device for mounting thereof on said main optical device; and a first straight slope portion formed at an inner part of said positioning recess so as to be consecutive with said convex arcuate portion in the direction of the depth of said positioning recess and having an inclination of more than 60° with respect to the direction of the relative movement of said auxiliary optical device for the mounting thereof on said main optical device.

15. An auxiliary optical device as defined in claim 14, further comprising a second straight slope portion formed at an inner part of said positioning recess so as to be consecutive with said first straight slope portion in the direction of the depth of said positioning recess and having an inclination of not less than 60° with respect to the direction of the relative movement of said auxiliary optical device for the mounting thereof on said main optical device, said inclination of said second straight slope portion being larger than that of said first straight slope portion.

16. An auxiliary optical device which is detachably mountable on a main optical device through movement of the former relative to the latter with their mount members being in contact with one another, wherein said main optical device includes a positioning member urged to project from the mount member of said main optical device to engage a positioning recess formed on. the mount member of said auxiliary optical device, a driving shaft fitted in a through-hole formed on the mount member of said main optical device with a predetermined clearance and urged to project from the mount member of said main optical device, and means for interconnecting said driving shaft with said positioning member so that said driving shaft is allowed to project from the mount member of said main optical device when said positioning member engages said positioning recess in the course of the relative movement of said auxiliary optical device for the mounting thereof on said main optical device, and wherein said positioning member includes a convex arcuate portion formed at the periphery of the corner of its distal end and a straight slope portion being consecutive with said convex arcuate portion in its longitudinal direction parallel to the direction of its projection from the mount member of said main optical device, said auxiliary optical device comprising a straight slope portion formed at the entrance part of said positioning recess on at least the front side thereof with respect to the direction of the relative movement of said auxiliary optical device for mounting thereof on said main optical device, and a driven shaft coupled with said driving shaft when said driving shaft projects from the mount member of said main optical device, wherein said positioning recess has a width which allows the engagement of said positioning member with a clearance being smaller than said clearance with which said driving shaft is fitted in said through-hole.

17. An auxiliary optical device as defined in claim 12, wherein said straight slope portion of said auxiliary optical device is formed at the periphery of the entrance part of said positioning recess.

18. A positioning mechanism for positioning an auxiliary optical device relative to a main optical device when mounting of said auxiliary optical device on said main optical device completes through movement of said auxiliary optical device relative to said main optical device in a predetermined direction with mount members of said main and auxiliary optical devices being in contact with one another, said mechanism comprising:

a positioning member provided on said main optical device and urged to project from said mount member of said main optical device;

a positioning recess provided on the mount member of said auxiliary optical device and having a width allowing engagement of said positioning member with a predetermined clearance, said positioning member and said positioning recess respectively including a front side face portion being at the front side with respect to the direction of said relative movement of said auxiliary optical device and a rear side face portion being opposite to and in alignment with said front side face portion in the direction of said relative movement of said auxiliary optical device such that said engagement starts due to the urging of said positioning member immediately after said front side face portions of said positioning member and said positioning recess come in alignment with one another as a result of said relative movement of said auxiliary optical device and such that said rear face portions of said positioning member and positioning recess come into contact with one another with said clearance interposed between said front face portions of said positioning member and positioning recess when said engagement completes, and said front face portions of said positioning member and said positioning recess having a configuration which allows said front face portions not to contact one another during the advancement of said engagement when said relative movement of said auxiliary optical device is effected at a speed faster than a predetermined speed;

a driven shaft provided in a first through-hole formed on said mount member of said auxiliary optical device;

a driving shaft provided in a second through-hole formed on said mount member of said main optical device and urged to project from said mount member of said main optical device for coupling with said driven shaft, the width of said second through-hole being determined such that said driving shaft is fit in the second through-hole with a clearance which is wider than said clearance of said engagement of said positioning member with said positioning recess; and means provided on said main optical device for interconnecting said driving shaft with said positioning member so that said driving shaft is allowed to project from said mount member of said main optical device when said positioning member engages said positioning recess in the course of said relative movement of said auxiliary optical device.

* * * * *